United States Patent [19]

Fuda

[11] Patent Number: 5,050,160
[45] Date of Patent: Sep. 17, 1991

[54] TRAINING METHOD FOR AN ECHO CANCELLER FOR USE IN A VOICE CONFERENCE SYSTEM

[75] Inventor: Hitoshi Fuda, Tokyo, Japan

[73] Assignee: NEC Corporation, Japan

[21] Appl. No.: 536,447

[22] Filed: Jun. 12, 1990

[30] Foreign Application Priority Data

Jun. 13, 1989 [JP] Japan .................... 1-151647

[51] Int. Cl.⁵ ............................................ H04M 9/08
[52] U.S. Cl. .................................. 370/32.1; 379/406; 379/410; 379/411
[58] Field of Search ............... 370/32.1; 379/410, 406, 379/411

[56] References Cited

U.S. PATENT DOCUMENTS

| | | | |
|---|---|---|---|
| 4,621,173 | 11/1986 | Guidoux | 379/411 |
| 4,827,473 | 5/1989 | Ferrieu | 370/32.1 |
| 4,852,161 | 7/1989 | Hagiwara | 379/410 |
| 4,891,801 | 1/1990 | Marcos et al. | 370/32.1 |
| 4,896,318 | 1/1990 | Kokubo et al. | 370/32.1 |

Primary Examiner—Douglas W. Olms
Assistant Examiner—Dang Ton
Attorney, Agent, or Firm—Ostrolenk, Faber, Gerg & Soffen

[57] ABSTRACT

A method for training an echo canceller of a voice conference system, to cancel an echo by subtracting an estimated echo signal from an actual echo signal, includes the steps of: generating, at a time of a first training session, an initial echo signal and an initial training signal through feeding of a training signal to a loudspeaker and to the echo canceller; obtaining a response characteristic of the echo canceller to the echo signals; storing the initial echo signal and the initial training signal; and training the echo canceller, during subsequent training sessions, by using the stored initial echo signal and the stored training signal.

2 Claims, 4 Drawing Sheets

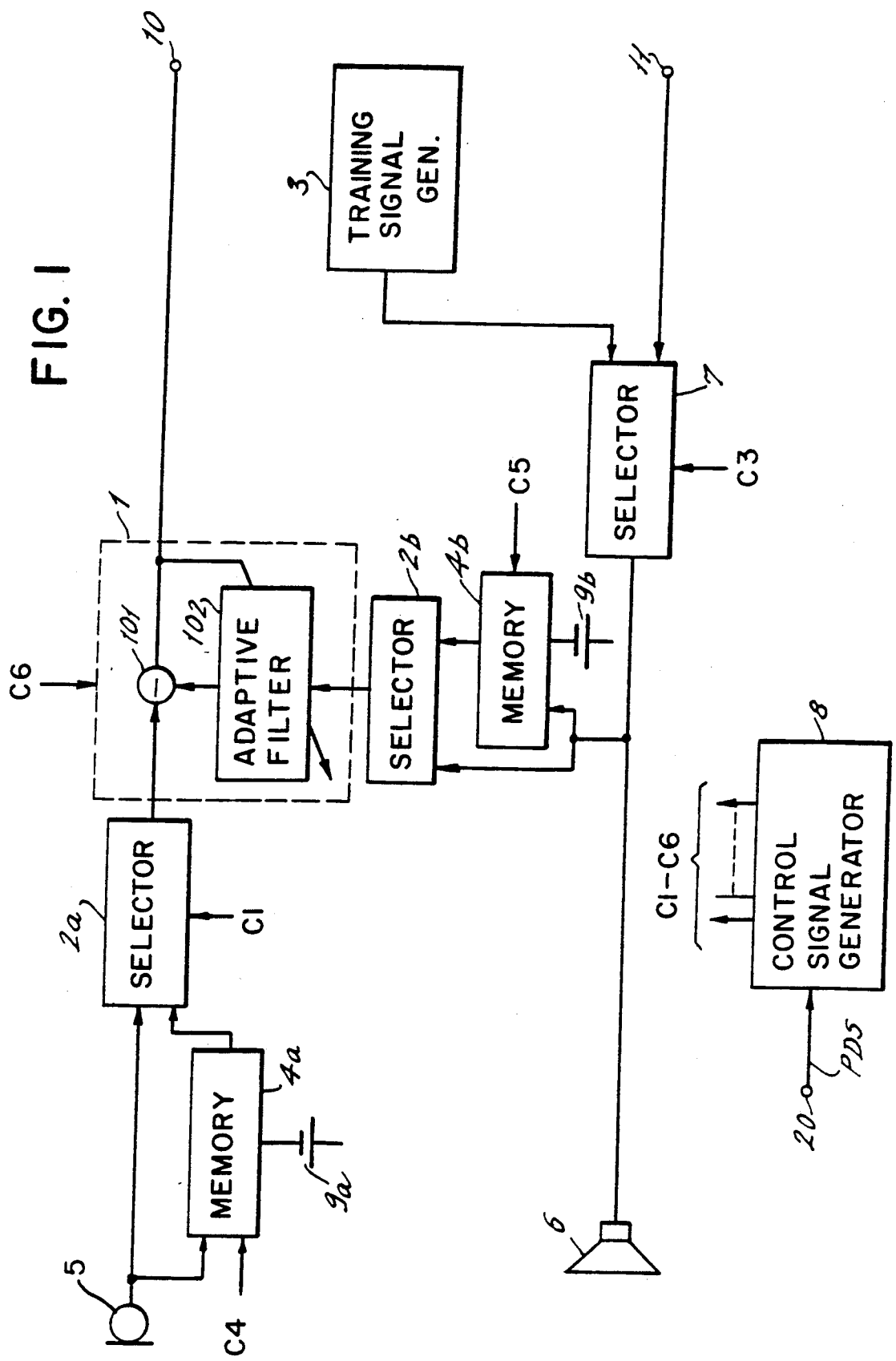

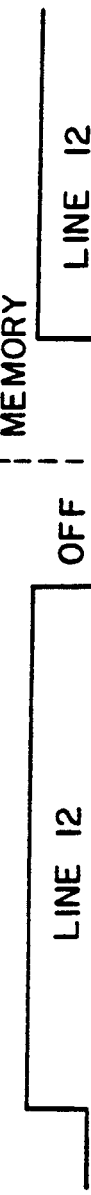
FIG. 2A POWER SUPPLY DETECTION
FIG. 2B SELECTOR CONTROL (C1)
FIG. 2C SELECTOR CONTROL (C2)
FIG. 2D SELECTOR CONTROL (C3)
FIG. 2E R/W CONTROL (C4)
FIG. 2F R/W CONTROL (C5)
FIG. 2G CANCELER CONTROL (C4)
FIG. 2H SPEAKER OUTPUT

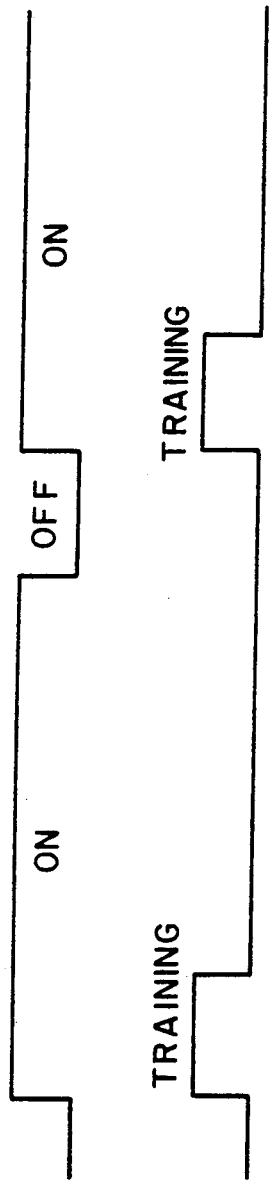
FIG. 4A POWER SUPPLY DETECTION
FIG. 4B SELECTOR CONTROL (C7)
FIG. 4C CANCELER CONTROL (C8)
FIG. 4D LINE DETECTION

TRAINING METHOD FOR AN ECHO CANCELLER FOR USE IN A VOICE CONFERENCE SYSTEM

BACKGROUND OF THE INVENTION

The present invention relates to a training method for an echo canceller for use in a voice conference system.

Voice conference systems, which have become known in the art, are effective for holding a conference or meeting of participants or attendants living in remote locations because the participants need not be physically present in the conference or meeting. Such systems are for use in connecting a plurality of auditoriums by a wire, a radio, and/or a satellite communication network.

A voice conference system has a loudspeaker used as a receiver and a microphone used as a transmitter. Since the loudspeaker is unavoidably acoustically coupled to the microphone, it is inevitable that a part of the audible sound reproduced by the loudspeaker is picked up by the microphone, resulting in a reverberation signal. The reverberation signal is sent back to the remote party, and in an unfavorable case, the reverberation signal gives rise to howling.

In order to eliminate echoes in the room without intercepting the voice signal of neither the transmitting nor the receiving party, it is effective to provide an echo canceller within the voice conference system. The echo canceller consists of an adaptive filter for generating an estimated echo signal according to an input voice signal, a subtractor for subtracting the estimated echo signal from the input voice signal and generating a residual echo signal, and a filter coefficient updating circuit for updating the coefficients to reduce the residual echo signal to zero. In such a conventional echo canceller for use in a voice conference system, the response characteristic of the adaptive filter in its initial state is different from that of the echo path, so that the echo canceller should be trained before the conference to bring the former close to the latter. A white noise signal is usually used for the training of the canceller so that the echo cancellation can be achieved substantially uniformly within the transmission band.

By the conventional way of training an echo canceller for a voice conference system, the canceller is trained, every time the line is to be connected to the remote party, by inputting a training signal to the loudspeaker and the echo canceller before the start of the conference. This prior art involves the disadvantage that the echo canceller should be trained every time a remote party is newly connected and reproduced noise comes out of the loudspeaker to annoy the conferees in the conference room.

SUMMARY OF THE INVENTION

An object of the present invention, therefore, is to eliminate the aforementioned problem and to provide a training method for an echo canceller for use in a voice conference system which does not require training every time a remote party is connected anew.

In accordance with the present invention, a method of training an echo canceller comprises the step of generating, at the time of a first training, an initial echo signal and an initial estimated echo signal by feeding a training signal to the loudspeaker and echo canceller. The echo canceller is trained in response to the initial echo signal and initial estimated echo signal to set a response characteristic of the echo canceller to the echo signal. The initial echo signal and initial estimated echo signal are stored in memories. After the first training, the echo canceller is trained by using the stored initial echo signal and stored estimated echo signal.

Also, in accordance with the present invention, a voice conference system comprises a send-out signal generating circuit having a microphone for producing a send-out signal and, a receive-in signal reproducing circuit for causing a loudspeaker to reproduce a receive-in signal coming in over a communication line to thereby output a reproduced signal. An echo canceller cancels, in response to the receive-in signal, an echo signal ascribable to the microphone which picks up the reproduced signal. A training signal generating circuit, generates a training signal for the echo canceller. A first memory store the training signal. A second memory store a training echo signal which the microphone produces by picking up a reproduced training signal which the loudspeaker has generated by reproducing the training signal. Selectors select, when the echo canceller is to be training for the first time, the training echo signal and training signal and, when the echo canceller is to be trained afterwards, select a training signal and a training echo signal which are stored in the first and second memories, respectively.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing a preferred embodiment of the present invention;

FIGS. 2A to 2H are timing charts representative of the operation of the system shown in FIG. 1;

FIGS. 4A to 4D are timing charts demonstrating the operation of the system shown in FIG. 3.

DETAILED DESCRIPTION OF THE PREFERRED EMBODIMENTS

Figure 3:
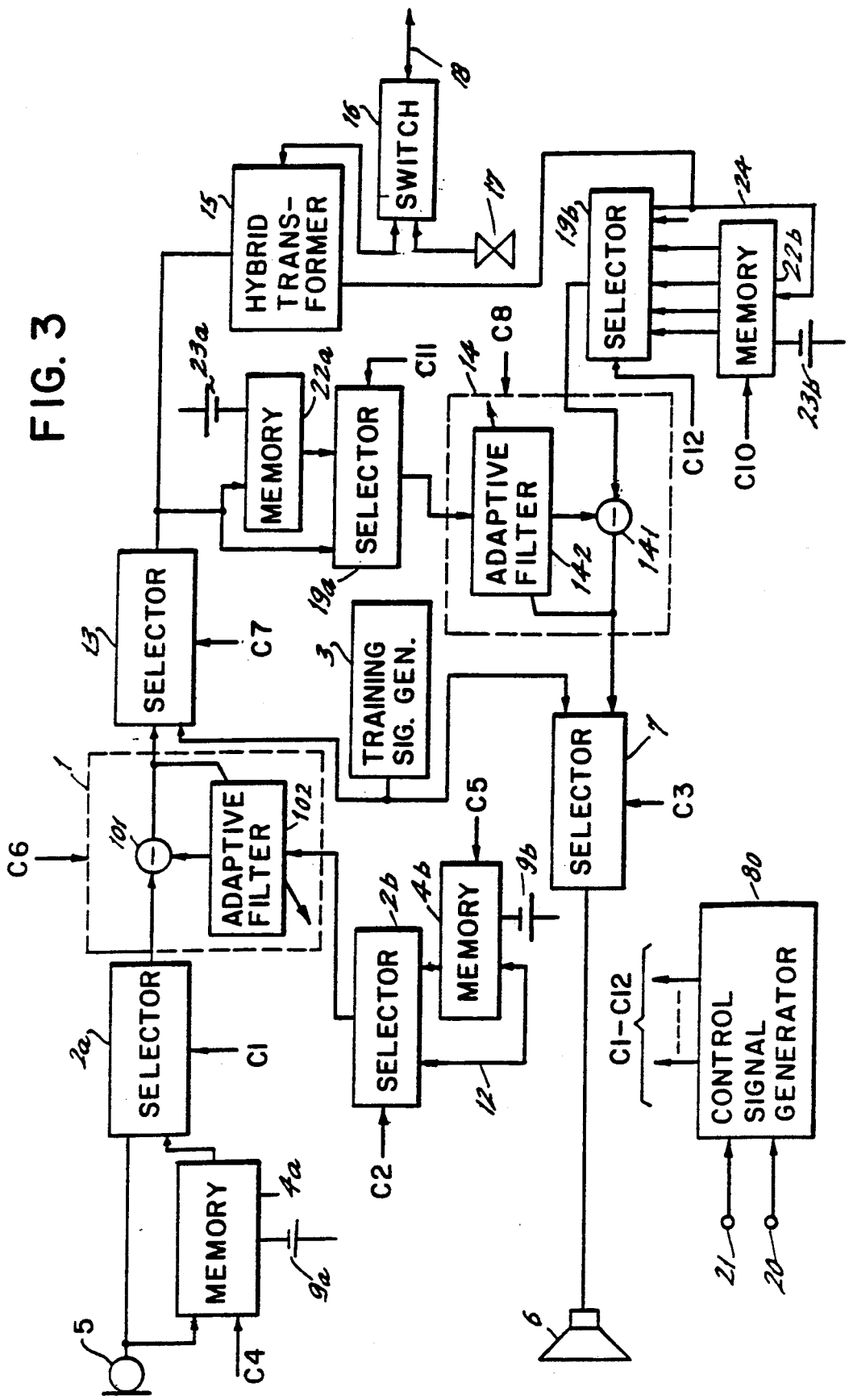
FIG. 3 is a block diagram showing an alternative embodiment of the present invention.

The present invention will be described in detail with reference to the accompanying drawings.

Referring to FIG. 1, a voice conference system representative of a preferred embodiment of the present invention is shown which is suitable for a four-wire circuit. As shown, a voice signal generated by a microphone 5 is fed out via an echo canceller 1 and an output terminal 10 to a communication path or line for transmission which is implemented as a four-wire circuit. A received voice signal comoing in over a communication path for reception via an input terminal 11 is applied to the echo canceller 1 and a loudspeaker 6. The reception path is also implemented as a four-wire circuit.

A selector $2a$ is arranged at the input side of the echo canceller 1 and selectively connects either one of the microphone 5 and a memory $4a$ to the echo canceller 1. Comprising a RAM, the memory $4a$ stores a signal which has been generated by the microphone 5 at the first training of the echo canceller 1, as will be described later specifically. A backup power source $9a$ is associated with the memory $4a$ so that the memory $4a$ may hold its content even when a main power source, not shown, is turned off.

A selector 2b is arranged at the other input side of the echo canceller 1 and selectively connects a signal line 12 and a memory 4b to the echo canceller 1. A backup power source 9b is associated with the memory 4b. The memory 4b stores a training signal which has appeared at the first training. A selector 7 selects the received voice signal and a training signal generated by a training signal generator 3, one at a time. A control signal generator, or controller, 8 receives a detection signal PDS which is fed from a power source detecting circuit, not shown, and representative of the turn-on of the main power source. In response, the control signal generator 8 generates control signals C1 to C3 for switching over the selectors 2a, 2b and 7, a control signal C6 for controlling the training of the echo canceller 1, and control signals C4 and C5 for controlling the write-in and read-out of the memories 4a and 4b. In the illustrative embodiment, the selectors 2a, 2b and 7 select respectively the microphone 5, signal line 12, and training signal generator 3 when their associated control signals C1 to C3 are in a high level, while selecting respectively the memory 4a, memory 4b, and input terminal 11 when the signals C1 to C3 are in a low level. The control signals C4 and C5 each is a two-bit signal, so that the memories 4a and 4b are caused into a write mode when the signals C4 and C5 are "00", for example, and into a read mode when the latter is "11". The echo canceller 1 performs training when the control signal C6 is "1" and holds the result of training when the latter is "0".

The echo canceller 1 has an adaptive filter 102 for generating an estimated echo signal in response to a received signal, and a subtractor 101 for subtracting the estimated echo signal from the echo signal in the room. The echo canceller 1 sequentially updates the response characteristic of the adaptive filter 102 such that the residual echo represented by the result of subtraction decreases to zero. It should be noted that an A/D converter behind the microphone 5 and a D/A converter behind the canceller 1 are omitted for simplicity of the drawing. Similarly, the A/D and D/A converters in front of the selector 7 and loudspeaker 6 are omitted.

A reference will be made to FIGS. 2A to 2H for describing the operation of the system shown in FIG. 1. How the echo canceller 1 is trained for the first time will be described first. When the main power source of the voice conference system is turned on, the controller 7 generates the control signals C1 to C6, FIGS. 2B to 2G, in response to the power detection signal PDS. The selectors 7 and 2a select respectively the training signal generator 3 and microphone 5 since the associated control signals C3 and C1 are in a high level or "1". Hence, the training signal (white noise) from the generator 3 is routed through the selector 7, loudspeaker 6, microphone 5 and selector 2a to the echo canceller 1 as a room echo. On the other hand, the selector 2b selects the signal line 12 in response to the high level or "1" of the control signal C2 with the result that the training signal is fed to the adaptive filter 102 of the echo canceller 1 via the selectors 7 and 2b as a received signal. In response to the high level or "1" of the control signal C6, the echo canceller 1 trains itself by using the received signal and echo signal. The echo canceller 1 holds the result of training when the control signal C6 turns to a low level or "0", thereby ending the first training. During the first training of the echo canceller 1, the echo signal and training signal are respectively written to the memories 4a and 4b since the associated control signals C4 and C5 are "00". Afterwards, a line setting circuit (not shown) including a telephone connects the communication line to a remote party so that conference may be held. While the conference is under way, the echo canceller 1 adaptively controls the response characteristic of the filter 102 is response to the received voice signal.

Assume that the main power source of the system has been turned off and then turned on later. Then, there occurs the second training of the echo canceller 1. Specifically, the controller 8 turns the control signals C1 and C2 to "0" to cause the selectors 2a and 2b to select the memories 4a and 4b, respectively. Also, the controller 8 turns the control signals C4 and C5 to "11" so that the memories 4a and 4b are conditioned for a read mode. As a result, the echo canceller 1 receives the stored echo signal read out of the memory 4a as an echo signal and receives the stored training signal read out of the memory 4b, thereby training itself. The memories 4a and 4b, therefore, allow the second training to be completed without any sound being generated by the loudspeaker 6.

Referring to FIG. 3, an alternative embodiment of the present invention is shown and applied to a two-wire circuit. This embodiment has, in addition to the components shown in FIG. 1, a hybrid transformer 15 for connecting a two-wire circuit to a four-wire circuit and, therefore, a second echo canceller 14 for cancelling echoes ascribable to the hybird transformer 15. For the training of the canceller 14, there is provided with selectors 19a and 19b and memories 22a and 22b. A selector 13 feeds a signal for training the second echo canceller 14. A switch 16 selects either one of the conference system and a telephone 17 adapted to connect the line to a remote party, and feeds to a terminal 21 of a control signal generator or controller 80 a line connection signal showing the fact that the line has been connected to the remote party.

A training method particular to the embodiment of FIG. 3 will be described with reference to FIGS. 4A to 4C. Since the training of the first echo canceller 1 proceeds in the same manner as has been described with reference to FIG. 1, the following description will concentrate on the second echo canceller 14. As the main power source of the system is turned on (FIG. 4A), the controller 80 generates control signals C1 to C12 (signals C1 to C6 being identical with those shown in FIG. 1) in response to the detection signal PDS which is applied to a terminal 20. In the first training, on the turn of the control signals C7 and C11 to "1", the selectors 7 and 19a selects the training signal and feeds it to an adaptive filter 142 included in the echo canceller 14 as a received signal. A part of the training signal is routed through the hybird transformer 15 and selector 19b, which selects a signal line 24 in response to "1" of the signal C12, to a subtractor 141 also included in the canceller 14 as an echo signal. In response to the control signal C8, the echo canceller 14 trains itself by using the echo signal and received signal, such that the residual echo signal decreases to zero. The result of training is held by the echo canceller 14. During the first training of the canceller 14, the echo signal and training signal are respectively written into the memories 22a and 22b in response to the control signals C10 and C11. Afterwards, when the line is connected to a remote party on the telephone 17 in order to hold voice conference, the switch 16 selects the line 18 and feeds the line connection signal to the controller 80 via the terminal 21. In response to "1" of the line connection signal (representative of "in conference"), the controller 80 turns the control signal C8 to "1" to thereby cause the echo canceller 14 into an adaptation operation.

then, the second training of the canceller 14 will be described. This occurs when the main power source of the system has been turned off and then turned on later. In the second training, the controller 80 changes the control signals C11 and C12 to cause the selectors 19a and 19b to select the memories 22a and 22b, respectively. Also, the controller 80 changes the control signals C9 and C10 so that the memories 22a and 22b are conditioned for a read mode. As a result, the echo canceller 14 receives the stored echo signal read out of the memory 22a as an echo signal and receives the stored training signal read out of the memory 22b, thereby training itself. The memories 22a and 22b, therefore, allow the second training to be completed without any sound being generated by the loudspeaker 6.

In summary, in accordance with the present invention, a memory is located at each of the transmitting and receiving sides of an echo canceller and is powered by a backup power source. The memories each stores an input signal having been routed through an echo path in the room. The echo canceller, therefore, can be trained without an annoying training signal being generated by a loudspeaker, allowing conference to be started smoothly. The training signal would otherwise be needed to generate a estimated echo signal of an echo canceller which would be lost by the turn-off of a power source circuit.

I claim:

1. A method of training an echo canceller for cancelling an echo by subtracting an estimated echo signal generated in response to a receive-in signal fed to a loudspeaker from an echo signal which is generated by a microphone in response to said receive-in signal, said method comprising the steps of:

generating, at the time of a first training, an initial echo signal by feeding an initial training signal to the loudspeaker;

training the echo canceller in response to the initial echo signal and the initial training signal to obtain a response characteristic of the echo canceller to the echo signal;

storing the initial echo signal and the initial training signal; and training, after the first training, the echo canceller by using the stored initial echo signal and the stored training signal.

2. A voice conference system comprising:

send-out signal generating means having microphone means for producing a send-out signal;

receive-in signal reproducing means for causing a loudspeaker to reproduce a receive-in signal coming in over a communication line to thereby output a reproduced signal;

echo canceller means for cancelling, in response to the receive-in signal, an echo signal ascribable to the microphone means which picks up the reproduced signal;

training signal generating means for generating a training signal for said echo canceller means;

first storing means for storing the training signal;

second storing means for storing a training echo signal which the microphone means produces by picking up a reproduced training signal which the loudspeaker has generated by reproducing the training signal; and selector means for selecting, when said echo canceller means is to be trained for the first time, the training echo signal and the training signal and, when said echo canceller means is to be trained afterwards, selecting a training signal and a training echo signal which are stored in said first and second storing means, respectively.

* * * * *